D. HARRINGTON.
Friction-Clutch Pulley.
No. 161,119. Patented March 23, 1875.
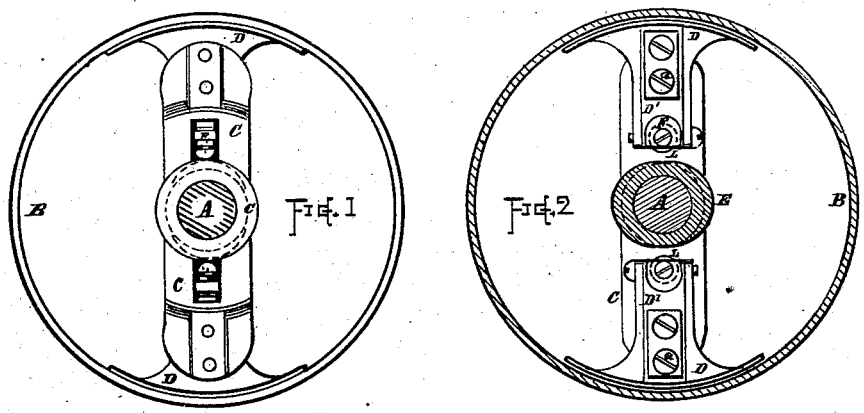
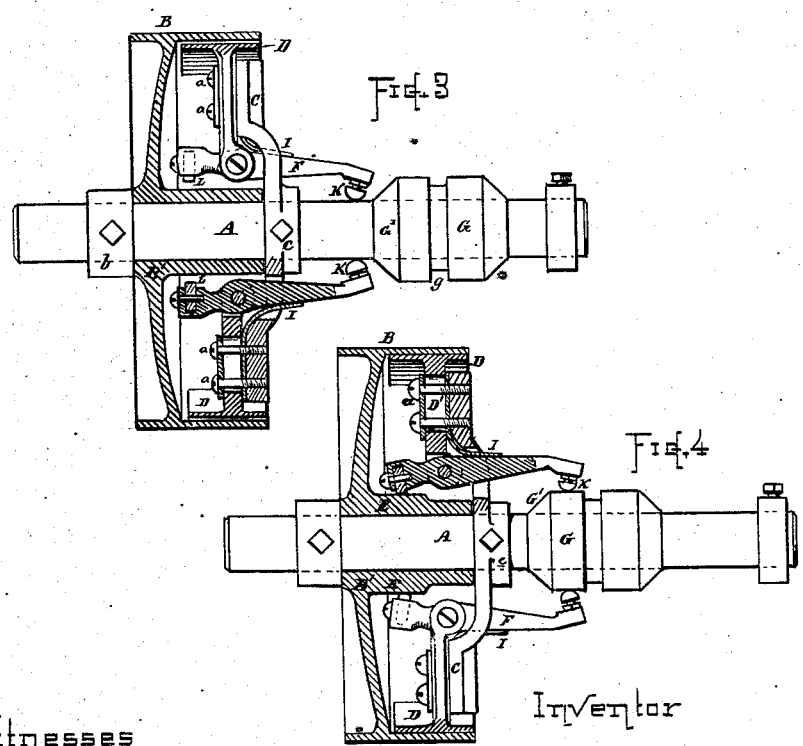
Witnesses
Charles D. Gay
Edgar T. Andrews
Inventor
David Harrington
by Attorney
Charles Burleigh

UNITED STATES PATENT OFFICE.

DAVID HARRINGTON, OF WORCESTER, MASSACHUSETTS, ASSIGNOR OF ONE-HALF HIS RIGHT TO NOAH D. GAY, OF SAME PLACE.

IMPROVEMENT IN FRICTION-CLUTCH PULLEYS.

Specification forming part of Letters Patent No. 161,119, dated March 23, 1875; application filed February 13, 1875.

*To all whom it may concern:*

Be it known that I, DAVID HARRINGTON, of the city and county of Worcester, and State of Massachusetts, have invented certain new and useful Improvements in Friction-Clutch Pulleys; and I do hereby declare that the following is a full, clear, and exact description of the same, reference being had to the accompanying drawings, which form a part of this specification, and in which—

Figure 1 represents a side view of a friction-clutch pulley embracing my invention. Fig. 2 represents a sectional view through the pulley in a plane perpendicular to the axis, showing an inner view of the clutch mechanism. Fig. 3 represents a sectional view parallel with the axis, showing the friction device released from contact with the rim; and Fig. 4 represents a similar view, showing the friction device in contact with the rim.

In friction-clutch pulleys, as heretofore constructed, the force required for bringing the friction-surfaces in contact is imparted by hand by means of the shipper-lever; and to obtain sufficient leverage to give the required pressure between the surfaces, the movement of the friction-pads has to be reduced to the smallest possible limit, thus requiring nice and frequent adjustment of the parts as the surfaces of the pads wear away, while, the pressure being comparatively light, the clutch is not positive in its action, but is liable to slip under heavy draft, and the rims are in some cases liable to catch and start the shaft when the clutch is open, especially if the pulley-hub becomes worn too loosely on the shaft.

To obviate these objections, and to provide a friction-clutch pulley wherein the force required for setting up the friction-pads shall be imparted by the driving parts instead of the shipper-lever, and to render the pulley positive in its action, is the object of my present invention.

The first part of my invention relates to the employment, in a friction-pulley, of a cam mechanism for pressing the friction-pads against the rim, or setting in contact the friction-clutch surfaces, by force exerted by the driving-belt or operating power, whereby the friction contact is maintained positive and proportional to the draft, while the shipper is relieved from all strain other than that required for setting the automatic parts into and out of action.

The second part of my invention relates to the employment, with the friction rim and pads, of a rotating cam and a lever-connecting device, actuated by the shipper, for setting the clutch mechanism into and out of action, as hereinafter described.

In the drawings, A denotes the shaft. B indicates the pulley, hung to revolve loosely on said shaft A, where it is retained in proper relative position by collars $b$ $c$, the driving-belt being arranged on the exterior surface of its rim. D D indicate the friction plates or pads, arranged, in the present instance, to work outward and inward, and to press against the inner surface of the pulley-rim when clutching the parts for operation of the shaft A. The friction-pads are supported on the arms C C, projecting radially from the collar or hub $c$, firmly keyed to the shaft A. The bolts or screws $a$ $a$, which hold the pads D to the arms, pass through slots in the pad-shanks D'. E indicates the cam for forcing outward the friction mechanism against the pulley-rim when the clutch is thrown into gear. This cam E is, in the present instance, formed directly upon the hub B' of the pulley; and levers F are pivoted to the pad-pieces D', against which the cam acts. The levers F pass through the arms C, with their outer ends in position to be engaged by the shipper-sleeve G, which latter is formed with an inclined surface, G', so that its end will readily pass under and throw outward the lever ends when it is moved forward by the shipper-lever, arranged in the groove $g$. Springs I are arranged at the outer sides of the levers F, to depress their outer ends against the shaft A when the shipper-sleeve G is moved back, and when thus depressed the inner ends of said levers F are raised beyond the reach of the cam E as it revolves with the pulley B. Adjusting-screws K are, in the present instance, arranged in the outer ends of the levers F, and bearing rolls L at their inner ends; but these screws K and rolls L may be dispensed with, if preferred, since the throw of the cam can be formed to give any required extent of movement to the pads D, thus obviating any necessity of adjustment of the parts after they are put together.

The operation is as follows: Pulley B being in motion, and the shaft A being at rest, the sleeve G of the shipper is moved by the shipper-lever along the shaft A, so that its inclined end enters between the levers F and raises their outer ends, to rest upon the straight portion of the sleeve. This depresses the inner ends of said levers F, and contracts the space between them to such an extent that the cam E is caused to act upon the levers, and, by forcing apart their inner ends, to press outward and against the rim B the friction-pads D, the sleeve G serving as a fulcrum for the levers F, while the entire force required for applying the frictional surfaces to each other is derived from the driving-belt, or from the same source of power by which the machinery is operated, thus relieving the shipper from all strain other than the slight amount required for moving the sleeve G.

It will be observed that the cam E, operating by the force of the driving-power, sets the frictional or clutch surfaces with a force proportional to the strain or draft necessary to transmit motion to the shaft A and machinery connected therewith, thus rendering the clutch positive in its action, and obviating all liability of its slipping under heavy strain.

The cam E may be varied in form and length of movement, and may be made with a greater or less number of working inclines or surfaces. It can also be formed with or secured to the hub, web, or other portion of the pulley mechanism, as most convenient, or best adapted to the particular requirements of the size or style of friction-clutch wheel or pulley wherein said cam is employed.

The cam E may also be employed with friction-pads and shipper-connections of other forms from those herein illustrated.

Having described my improvements in friction-clutch pulleys, what I claim therein as new and of my invention, and desire to secure by Letters Patent, is—

1. The cam E, when employed in combination with the clutching or frictional surfaces and the movable sleeve or shipper in a friction-clutch wheel or pulley, for forcing into contact said frictional surfaces and locking the clutch, the parts being arranged for automatic action by force derived from the driving belt or power.

2. Substantially as described, in a friction-clutch pulley, the cam E, in combination with the pulley B, friction-pads D, and shipping-sleeve G, when used to automatically bring the friction-pads in contact with their bearing-surfaces on the pulley.

3. The combination, with the cam E, rotating with the pulley, the friction-pads D, connected with the shaft, and shipper-sleeve G, of the levers F and springs I, substantially as and for the purpose set forth.

4. The combination, with the cam E, pads D, shaft A, and shipper-sleeve G, of the levers F and springs I, as and for the purpose set forth.

DAVID HARRINGTON.

Witnesses:
   CHAS. H. BURLEIGH,
   EDGAR T. ANDREWS.